United States Patent
Wang

(10) Patent No.: US 11,846,714 B2
(45) Date of Patent: Dec. 19, 2023

(54) PRECISE POINT POSITIONING (PPP) WITH MODIFIED SATELLITE AND CLOCK ERROR MITIGATION

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/399,602

(22) Filed: Aug. 11, 2021

(65) Prior Publication Data
US 2023/0048194 A1  Feb. 16, 2023

(51) Int. Cl.
*G01S 19/44* (2010.01)
*G01S 19/07* (2010.01)
*G01S 19/39* (2010.01)

(52) U.S. Cl.
CPC .......... *G01S 19/44* (2013.01); *G01S 19/072* (2019.08); *G01S 19/393* (2019.08)

(58) Field of Classification Search
CPC ....... G01S 19/44; G01S 19/072; G01S 19/393
See application file for complete search history.

(56) References Cited

PUBLICATIONS

Liu, Tianjun, et al. "A new weighting approach with application to ionospheric delay constraint for GPS/GALILEO real-time precise point positioning." Applied Sciences 8.12 (2018): 2537. (Year: 2018).*

Walter, Todd, Kazuma Gunning, and Juan Blanch. "Improved ephemeris monitoring for GNSS." Proceedings of the 2016 International Technical Meeting of The Institute of Navigation. 2016. (Year: 2016).*

* cited by examiner

*Primary Examiner* — Alan D Hutchinson
(74) *Attorney, Agent, or Firm* — QUALCOMM Incorporated

(57) ABSTRACT

Embodiments described herein provide for enabling a mobile device comprising a GNSS receiver to implement a modified PPP technique that utilizes orbit and clock information of a satellite that is broadcast from the satellite. In particular, embodiments may utilize a positioning engine to perform PPP error mitigation with respect to various error sources (e.g., troposphere, ionosphere, phase windup, etc.). With regard to errors stemming from satellite orbit and satellite clock, embodiments may utilize orbit and clock information from broadcast ephemeris data rather than obtaining precise orbit and clock information (e.g., from a third party provider). Further, embodiments may account for errors in this broadcast information by adjusting the ambiguity dynamic and/or ambiguity estimate term used by the positioning engine. This can enable the positioning engine to determine a solution more accurate than traditional GNSS without resetting.

30 Claims, 12 Drawing Sheets

| Error source (for carrier phase) | Magnitude | Standard PPP Mitigation method | Modified PPP Mitigation method |
|---|---|---|---|
| Satellite orbit | 1-2m | Precise orbit product, e.g. from IGS | Considered in PPP ambiguity dynamic, larger ambiguity dynamic |
| Satellite clock | | Precise clock product | |
| Different code bias (DCB) | meters | DCB product, e.g. from IGS | Same as standard PPP |
| Satellite phase windup | < 0.5 cycle | Model based on Sun and satellite position | |
| Troposphere | 2-20m | Troposphere wet zenith delay estimate in KF | |
| Ionosphere | 1-100m | Iono-free combination | |
| Multipath | < 0.25 cycle | Filtering | |
| Site displacement (Solid earth tide, polar motion, ocean tide) | < 1m | Model | |
| Antenna PCV | cm | Pre-calibration | |
| Phase windup (receiver) | unbounded | Estimated in receiver clock term in KF | |
| Receiver clock | < 1ms | Estimated in KF | |
| Receiver noise | 0.01 cycle | Filtering | |

FIG. 3

PRECISE POINT POSITIONING (PPP) WITH MODIFIED SATELLITE AND CLOCK ERROR MITIGATION

BACKGROUND

1. Field of Disclosure

The present disclosure relates generally to the field of satellite-based positioning.

2. Description of Related Art

Global Navigation Satellite Systems (GNSS) positioning of mobile devices (e.g., consumer electronics, vehicles, assets, drones, etc.) can provide accurate positioning of a mobile device comprising a GNSS receiver. Traditional GNSS positioning provides an accuracy on the order of a few meters, and more precise GNSS-based techniques can provide sub-meter accuracy. Precise Point Positioning (PPP) is one such GNSS-based technique that provides more precision. However, to implement PPP, a GNSS receiver must obtain precise orbit and clock information of satellites from a third party provider.

BRIEF SUMMARY

Embodiments described herein provide for enabling a mobile device comprising a GNSS receiver to implement a modified PPP technique that utilizes orbit and clock information of a satellite that is broadcast from the satellite. In particular, embodiments may utilize a positioning engine to perform PPP error mitigation with respect to various error sources (e.g., troposphere, ionosphere, phase windup, etc.). With regard to errors stemming from satellite orbit and satellite clock, embodiments may utilize orbit and clock information from broadcast ephemeris data rather than obtaining precise orbit and clock information (e.g., from a third party provider). Further, embodiments may account for errors in this broadcast information by adjusting the ambiguity dynamic and/or ambiguity estimate term used by the positioning engine. This can enable the positioning engine to determine a solution more accurate than traditional GNSS without resetting.

An example method of Global Navigation Satellite Systems (GNSS)-based positioning of a mobile device, according to this disclosure, may comprise obtaining, at the mobile device, ephemeris data regarding a GNSS satellite. The method also may comprise obtaining information indicative of an error related to the ephemeris data. The method also may comprise determining range measurements using signals received with a multi-frequency GNSS receiver of the mobile device. The method also may comprise determining an ionosphere-free combination of range measurements using signals transmitted by the GNSS satellite. The method also may comprise determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

An example mobile device for performing Global Navigation Satellite Systems (GNSS)-based positioning of the mobile device, according to this disclosure, may comprise a multi-frequency GNSS receiver, a memory, one or more processors communicatively coupled with the multi-frequency GNSS receiver and the memory, wherein the one or more processors are configured to obtain, with the multi-frequency GNSS receiver, ephemeris data regarding a GNSS satellite. The one or more processors further may be configured to obtain information indicative of an error related to the ephemeris data. The one or more processors further may be configured to determine range measurements using signals received with the multi-frequency GNSS receiver. The one or more processors further may be configured to determine an ionosphere-free combination of range measurements using signals transmitted by the GNSS satellite. The one or more processors further may be configured to determine a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

An example apparatus for Global Navigation Satellite Systems (GNSS)-based positioning of a mobile device, according to this disclosure, may comprise means for obtaining, at the mobile device, ephemeris data regarding a GNSS satellite. The apparatus further may comprise means for obtaining information indicative of an error related to the ephemeris data. The apparatus further may comprise means for determining range measurements using signals received with a multi-frequency GNSS receiver of the mobile device. The apparatus further may comprise means for determining an ionosphere-free combination of range measurements using signals transmitted by the GNSS satellite. The apparatus further may comprise means for determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

According to this disclosure, an example non-transitory computer-readable medium stores instructions for Global Navigation Satellite Systems (GNSS)-based positioning of a mobile device, the instructions comprising code for obtaining at the mobile device, ephemeris data regarding a GNSS satellite. The instructions further may comprise code for obtaining information indicative of an error related to the ephemeris data. The instructions further may comprise code for determining range measurements using signals received with a multi-frequency GNSS receiver of the mobile device. The instructions further may comprise code for determining an ionosphere-free combination of range measurements using signals transmitted by the GNSS satellite. The instructions further may comprise code for determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 3 is a table that lists various error sources and mitigation techniques for standard PPP techniques as well as modified PPP techniques as described herein, according to an embodiment.

Figure 1:
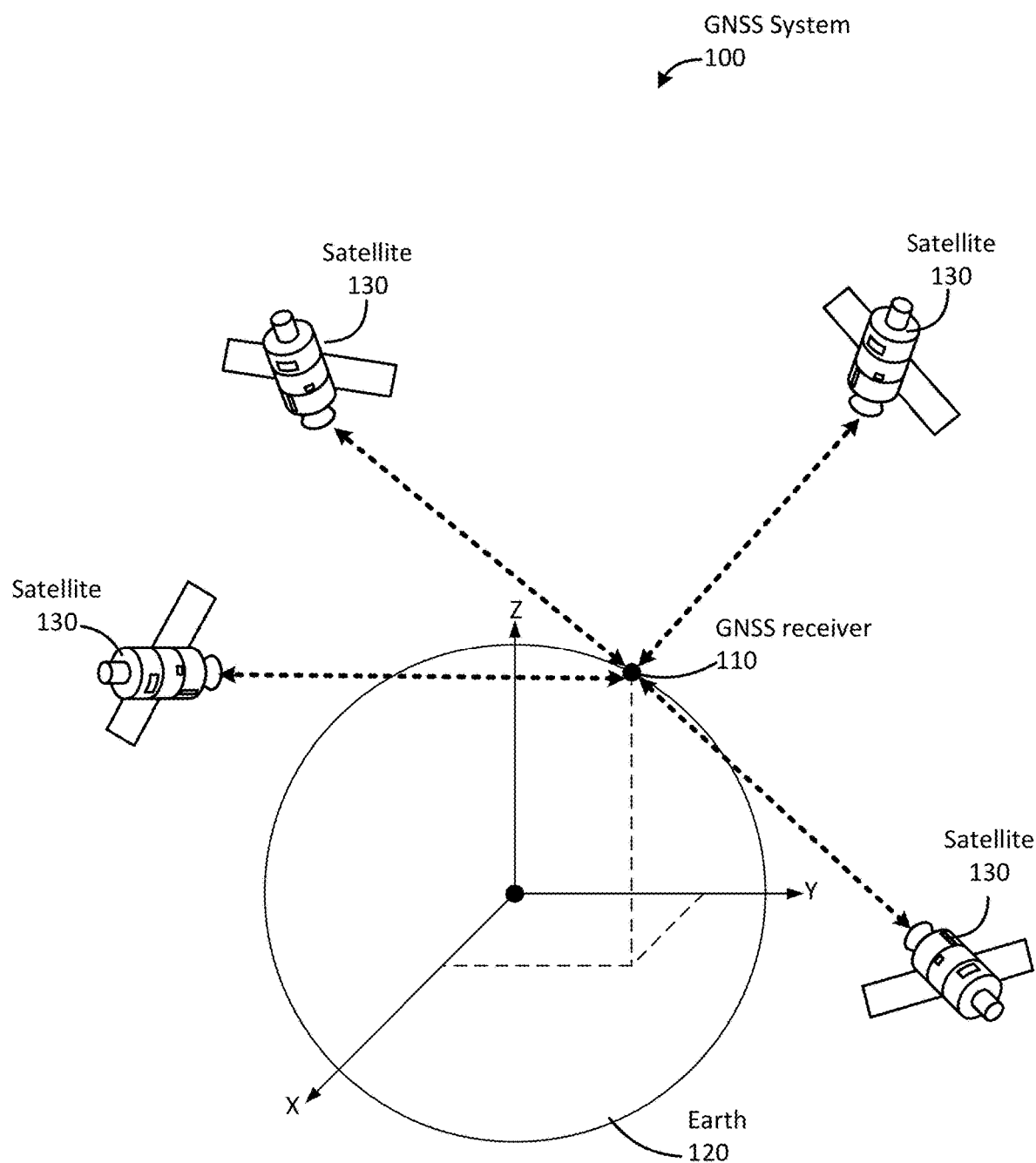
FIG. 1 is a simplified diagram of a GNSS system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

As described herein, a satellite receiver, such as a Global Navigation Satellite Systems (GNSS), may be integrated into a mobile device comprising an electronic device or system. Such a mobile device can include, for example, consumer, industrial, and/or commercial electronics, vehicles, assets, vessels, and the like. As described herein, a location estimate of the satellite receiver or mobile device into which the satellite receiver is integrated may be referred to as a location, location estimate, location fix, fix, position, position estimate, or position fix of the satellite receiver or mobile device. Moreover, the location estimate may be geodetic, thus providing location coordinates for the mobile device (e.g., latitude and longitude) which may or may not include an altitude component (e.g., height above sea level, height above or depth below ground level, floor level, or basement level). In some embodiments, a location of the satellite receiver and/or mobile device comprising the satellite receiver may also be expressed as an area or volume (defined either geodetically or in civic form) within which the satellite receiver is expected to be located with some probability or confidence level (e.g., 68%, 95%, etc.). In the description contained herein, the use of the term location may comprise any of these variants unless indicated otherwise. When computing the location of a satellite receiver, such computations may solve for local X, Y, and possibly Z coordinates and then, if needed, convert the coordinates from one coordinate frame to another.

As noted, embodiments described herein utilize a modified PPP technique in which broadcast satellite orbit and clock information is used in conjunction with PPP error mitigation for errors from error sources other than satellite orbit and clock.to enable the use of broadcasts satellite orbit and clock without resetting the positioning engine (e.g., a Kalman filter (KF)), the ambiguity dynamic and/or ambiguity estimate term of the positioning engine may be adjusted to account for errors in the broadcast satellite orbit and clock. Additional details will follow after an initial description of relevant systems and technologies.

FIG. 1 is a simplified diagram of a GNSS system 100, provided to illustrate how GNSS is generally used to determine an accurate location of a GNSS receiver 110 on earth 120 (also known as "positioning" of the GNSS receiver). Put generally, the GNSS system 100 enables an accurate GNSS position fix of the GNSS receiver 110, which receives radio frequency (RF) signals from GNSS satellites 130 from one or more GNSS constellations. (A satellite such as GNSS satellites 130 may also be referred to herein as a space vehicle (SV).) The types of GNSS receiver 110 used may vary, depending on application. In some embodiments, for instance, the GNSS receiver 110 may comprise consumer electronics or devices, such as a mobile phone, tablet, laptop, wearable device, vehicle (or on-vehicle device), or the like. In some embodiments, the GNSS receiver 110 may comprise industrial or commercial equipment, such as survey equipment.

It will be understood that the diagram provided in FIG. 1 is greatly simplified. In practice, there may be dozens of satellites 130 and a given GNSS constellation, and there are many different types of GNSS systems. GNSS systems include, for example, Global Positioning System (GPS), Galileo (GAL), GLONASS, Quasi-Zenith Satellite System (QZSS) over Japan, Indian Regional Navigational Satellite System (IRNSS) over India, BeiDou Navigation Satellite System (BDS) over China, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 110 in three dimensions may rely on a determination of the distance between the GNSS receiver 110 and four or more satellites 130. As illustrated, 3D coordinates may be based on a coordinate system (e.g., XYZ coordinates; latitude, longitude, and altitude; etc.) centered at the earth's center of mass. A distance between each satellite 130 and the GNSS receiver 110 may be determined using precise measurements made by the GNSS receiver 110 of a difference in time from when a radio frequency (RF) signal is transmitted from the respective satellite 130 and when it is received at the GNSS receiver 110. To help ensure accuracy, not only does the GNSS receiver 110 need to make an accurate determination of when the respective signal from each satellite 130 is received, but many additional factors need to be considered and accounted for. These factors include, for example, clock differences at the GNSS receiver 110 and satellite 130 (e.g., clock bias), a precise location of each satellite 130 at the time of transmission (e.g., as determined by the broadcast ephemeris), the impact of atmospheric distortion (e.g., ionospheric and tropospheric delays), and the like.

To perform a traditional GNSS position fix, the GNSS receiver 110 can use code-based positioning to determine its distance to each satellite 130 based on a determined delay in a generated pseudorandom binary sequence received in the RF signals received from each satellite, in consideration of the additional factors and error sources previously noted. With the distance and location information of the satellites 130, the GNSS receiver 110 can then determine a position fix for its location. This position fix may be determined, for example, by a Standalone Positioning Engine (SPE) executed by one or more processors of the GNSS receiver 110. However, code-based positioning is relatively inaccurate and, without error correction, is subject to many of the previously described errors. Even so, code-based GNSS positioning can provide an positioning accuracy for the GNSS receiver 110 on the order of meters.

More accurate carrier-based ranging is based on a carrier wave of the RF signals from satellites and may use measurements at a base or reference station (not shown) to perform error correction to help reduce errors from the previously noted error sources. More specifically, errors (e.g., atmospheric errors sources) in the carrier-based ranging of satellites 130 observed by the GNSS receiver 110 can be mitigated or canceled based on similar carrier-based ranging of the satellites 130 using a highly accurate GNSS receiver at the base station at a known location. These measurements and the base station's location can be provided to the GNSS receiver 110 for error correction. This position fix may be determined, for example, by a Precise Positioning Engine (PPE) executed by one or more processors of the GNSS receiver 110. More specifically, in addition to the information provided to an SPE, the PPE may use base station GNSS measurement information, and additional correction information, such as precise orbit and clock, troposphere and ionosphere, to provide a high accuracy, carrier-based position fix. Several GNSS techniques can be adopted in PPE, such as Differential GNSS (DGNSS), Real Time Kinematic (RTK), and PPP, and may provide a sub-meter accuracy (e.g., on the order of centimeters).

Figure 2:
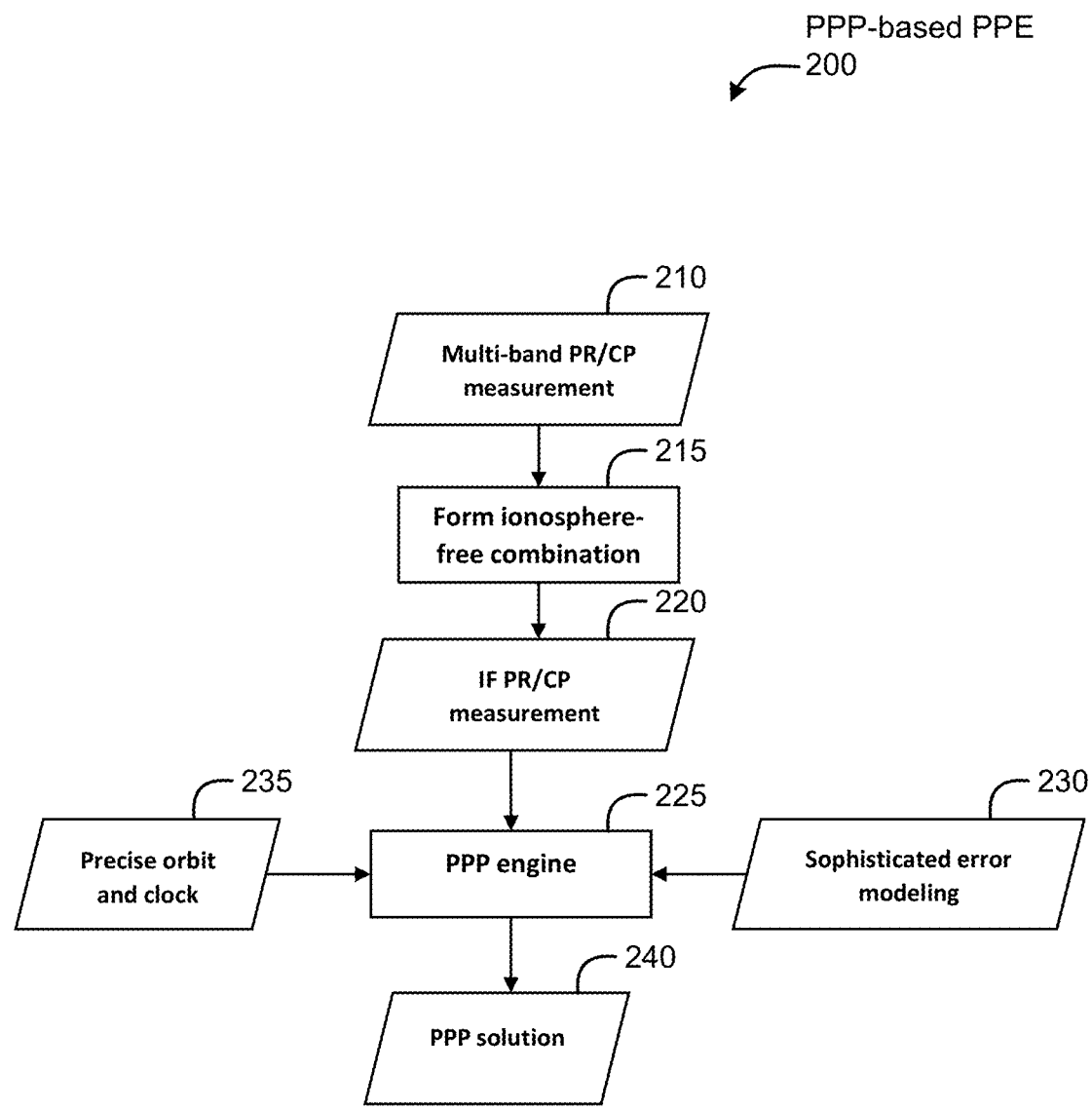
FIG. 2 is a block diagram of a Precise Point Positioning (PPP) Precise Positioning Engine (PPE), according to an embodiment.

FIG. 2 is a block diagram of a PPP-based PPE 200, which may be used to perform the techniques described hereinafter, according to an embodiment. The blocks in FIG. 2 comprise data and logical processes used by a PPE to perform PPP-based positioning of a GNSS receiver (e.g., the GNSS receiver 110 of FIG. 1). As noted, the PPE may be executed by one or more processors of the GNSS receiver and/or device (e.g. mobile device) into which the GNSS receiver may be integrated.

At block 210, the GNSS receiver obtains multi-band pseudo-range (PR) and carrier phase (CP) measurement of signals from each of the plurality of satellites (e.g., satellites 130 of FIG. 1). PR and CP measurements may correspond with code-based and carrier-based measurements, respectively, as previously described. To make a multi-band measurement (a measurement of signals using two or more frequencies transmitted by a satellite), embodiments may use a multi-band GNSS receiver (e.g., a dual-band receiver, tri-band receiver, etc.) capable of receiving a plurality of frequency bands. Some embodiments may use multi-constellation multi-frequency (MCMF) receivers capable of receiving multiple frequency bands on multiple constellations. Examples of different bands like me used for the multi-band PR/CP measurement at block 210 include, L1/L5 for GPS, E1/E5A for GAL, and B1C/B2A for BDS. Other embodiments may use additional or alternative bands and/or GPS constellations.

At block 215, and ionosphere-free (IF) combination is formed. An ionosphere-free combination comprises a linear combination of code and/or carrier measurements that can eliminate first order ionospheric effects from ionospheric refraction, which can increase the accuracy of the positioning solution. As shown by block 220, the ionosphere-free (IF) PR/CP measurement formed from the IF combination is provided to the PPP engine 225.

The sophisticated error modeling at block 230 comprises error modeling to mitigate inaccuracies based on various error sources. As illustrated in the table shown in FIG. 3, standard PPP error mitigation includes error reduction techniques to reduce satellite different code bias (DCB), satellite phase windup-up, site displacement, and more. As further indicated in FIG. 3, these errors may result in inaccuracies of several meters or more, and mitigation can be performed by a KF, which may estimate these errors/values.

Returning to FIG. 2, the PPP engine 225 uses the IF PR/CP measurement (block 220), sophisticated error modeling (block 230), and precise orbit and clock (block 235) to conduct a KF estimation to provide the PPP solution at block 240. As a person of ordinary skill in the art will appreciate, a PPP engine can be implemented using an Extended Kalman Filter (EKF).

As previously discussed and noted in FIG. 3, standard PPP mitigation utilizes precise orbit and clock products from a service, such as the International GNSS Service (IGS) and others, which can be obtained in real time. However, this dependency on a service can limit the usefulness of traditional or standard PPP in many applications. Moreover, the cost of many of these services can also limit usefulness.

As noted, embodiments address these and other issues by providing using a modified PPP technique that utilizes orbit and clock information of a satellite that is broadcast from the satellite, thereby reducing or eliminating dependency on a third-party provider service to obtain a position estimate for a GNSS receiver with a higher degree of accuracy than standard GNSS. Returning to FIG. 3, details regarding an embodiment of the modified technique are provided in the right-most column. In particular, according to some embodiments, standard PPP mitigation techniques can be used to mitigate errors from various sources. However, with regard to satellite orbit and satellite clock errors, rather than using precise orbit and precise clock from a service (e.g., block 235 of FIG. 2), the modified PPP mitigation method can use the orbit and clock information broadcast from a satellite. As described in further detail hereafter, within the PPP engine (e.g., PPP engine 225), the ambiguity dynamic and/or ambiguity estimate term (e.g., of the Kalman filter of the PPP engine) can be adjusted to compensate for errors in this broadcast information, which are greater than those in orbit and clock information provided by a service. (As used herein, the ambiguity dynamic and ambiguity estimate term may be referred to collectively as an "ambiguity" of the PPP engine or KF. Further, an "ambiguity adjustment" may refer to as an adjustment of either or both of the ambiguity dynamic and the ambiguity estimate term.) Errors in broadcast information are discussed in further detail hereafter with regard to FIGS. 4-7. With regard to DCB, although a DCB product still be obtained from a provider service, the value may be good for weeks or months. This therefore results in far less time dependency than with satellite orbit and satellite clock (which as noted, may be obtained in real time).

Figure 4:
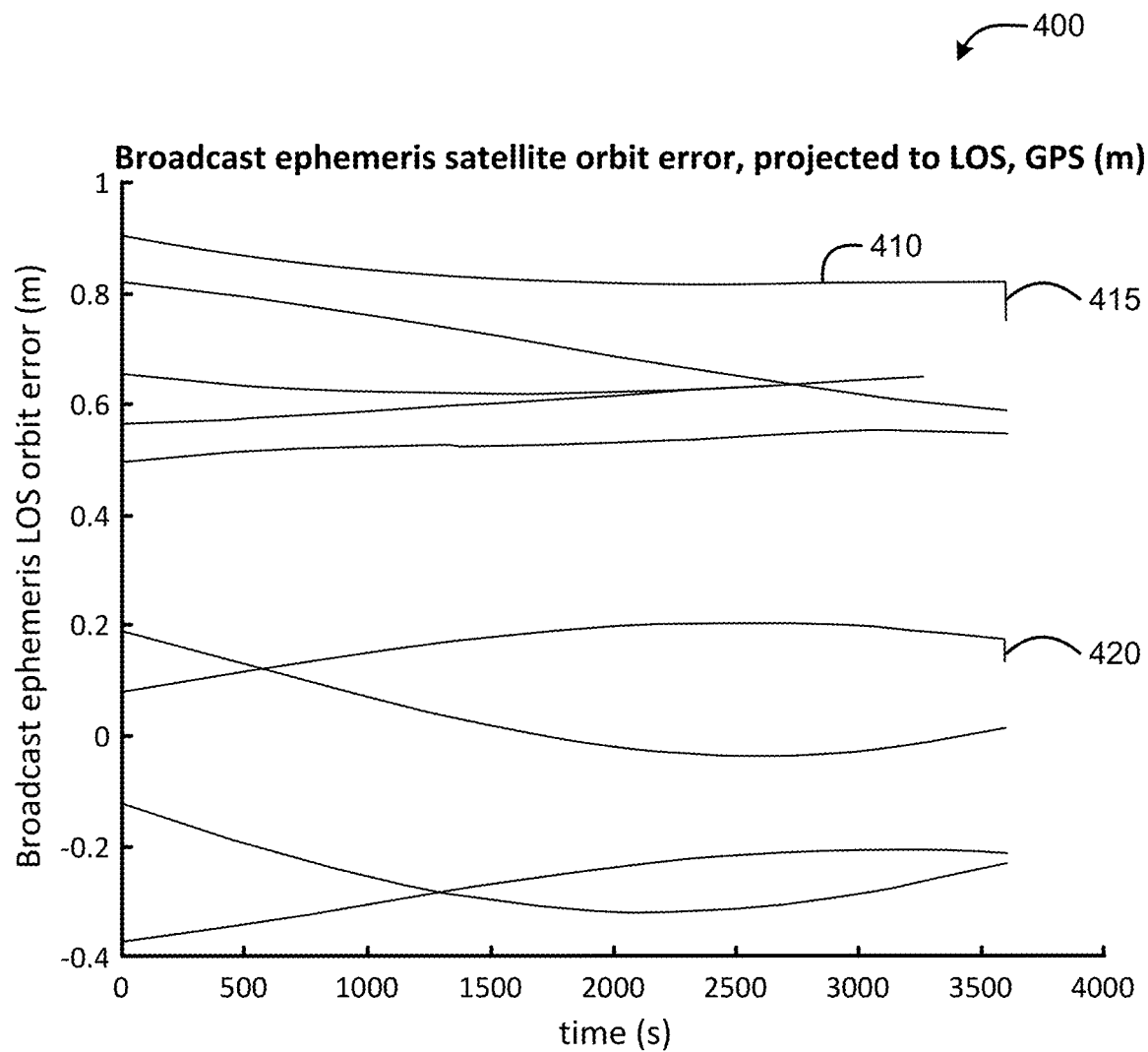
FIGS. 4-7 are graphs showing example satellite orbit and clock errors, which can be accommodated for using the techniques described herein.

FIG. 4 is a graph 400 showing satellite orbit error from broadcast ephemeris for GPS over the period of one hour (3600 s), as compared with precise orbit information provided by IGS. (Because the accuracy of the precise orbit information may be on the order of a few centimeters or less, it is considered "truth" for purposes of the graphs in FIGS. 4-7). Error is projected to a line-of-sight (LOS) vector between the satellite and the receiver. Each plot in the graph 400 represents satellite orbit error from a different GPS satellite.

As can be seen from the various plots in the graph 400, satellite orbit error may be large relative to other error sources but may vary slowly with time. As an example, and ignoring the sudden value change 415, the satellite error shown by the top-most plot starts at approximately 0.9 m and slowly lowers to approximately 0.82 over the course of the hour plotted in graph 400. The satellite orbit error shown by the other plots in the graph 400 experience a similarly slow variation. This slow variation allows the orbit error to be absorbed in the ambiguity dynamic in the PPP engine if kept as a float solution for the position estimate. More specifically, a dynamic KF configured to execute a PPP engine may include an ambiguity dynamic, also known as a "spectrum density," that configures the amount of variation in the ambiguity allowable by the PPP engine. In traditional PPP, this dynamic is typically set to zero. However, according to some embodiments, this dynamic can be given a nonzero value and may be adjusted dynamically based on an amount of change, or "drift," in the satellite orbit error. Larger changes can result in larger value adjustments, and smaller changes can result in smaller value adjustments.

Figure 5:
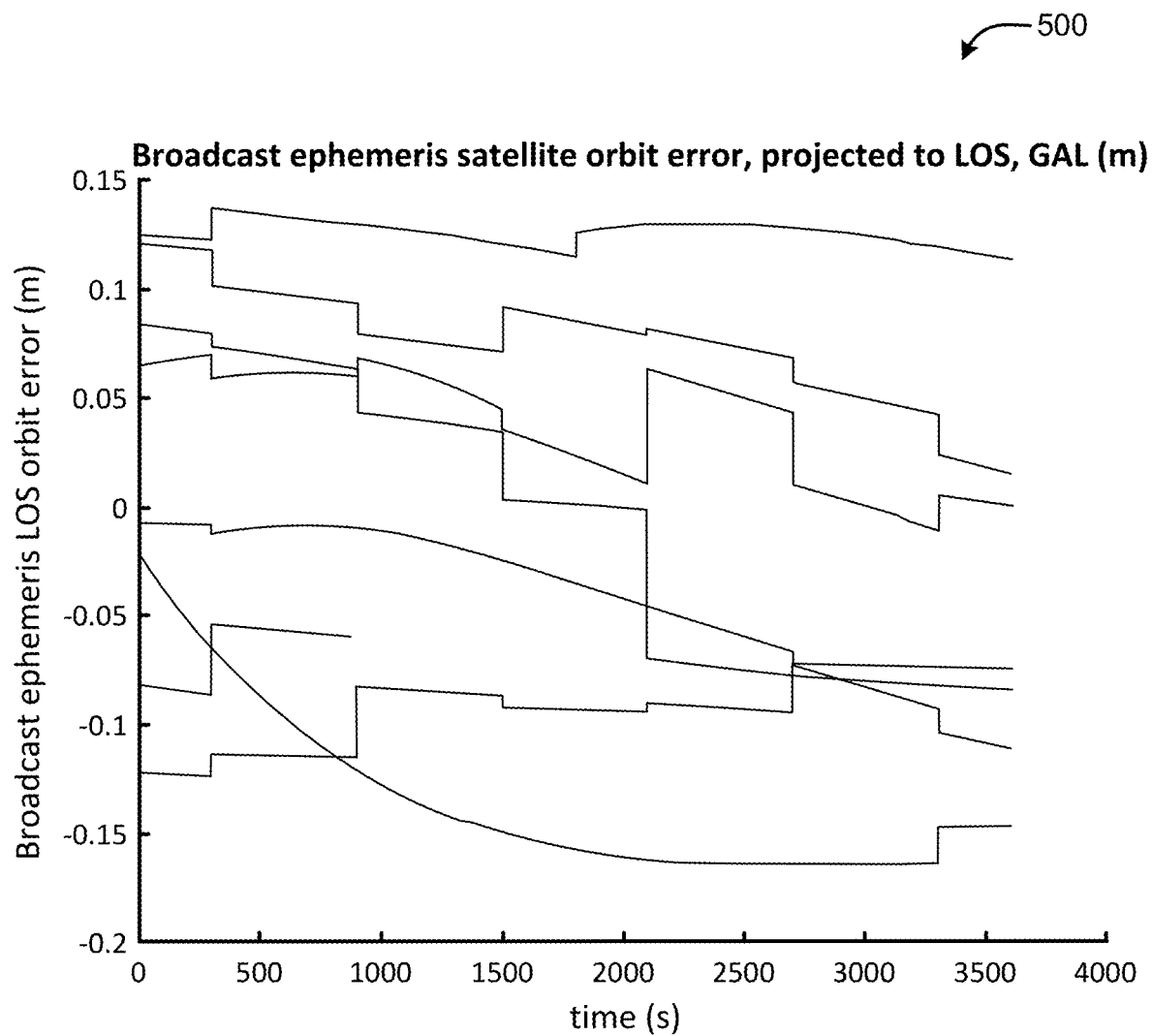

Further, embodiments can accommodate any rapid or sudden value changes, such as those at 415 and 420, which may otherwise reset a PPP engine. These sudden changes in satellite orbit error values are due to Issue Of Data Ephemeris (IODE) changes, which occur every two hours for GPS (changes occur at different times for different satellite groups). For GAL, these IODE "jumps" occur more frequently. FIG. 5 is an illustration of a graph 500 plotting satellite orbit error from broadcast ephemeris similar to the graph 400 of FIG. 4, but for GAL. Although the change in error due to IODE jumps is smaller than that for GPS (as is the absolute satellite orbit error itself), embodiments may still accommodate these sudden value changes in broadcast satellite orbit error. Further, broadcast satellite clock error may undergo similar IODE jumps, as shown at 615 and 620 in FIG. 6, and may be treated similarly according to some embodiments. Accommodating abrupt changes to satellite orbit and/or clock error values due to IODE jumps and/or other causes can be performed by adaptively adjusting the ambiguity estimate term in the KF executing the PPP engine (e.g., a PPP EKF).

Figure 6:
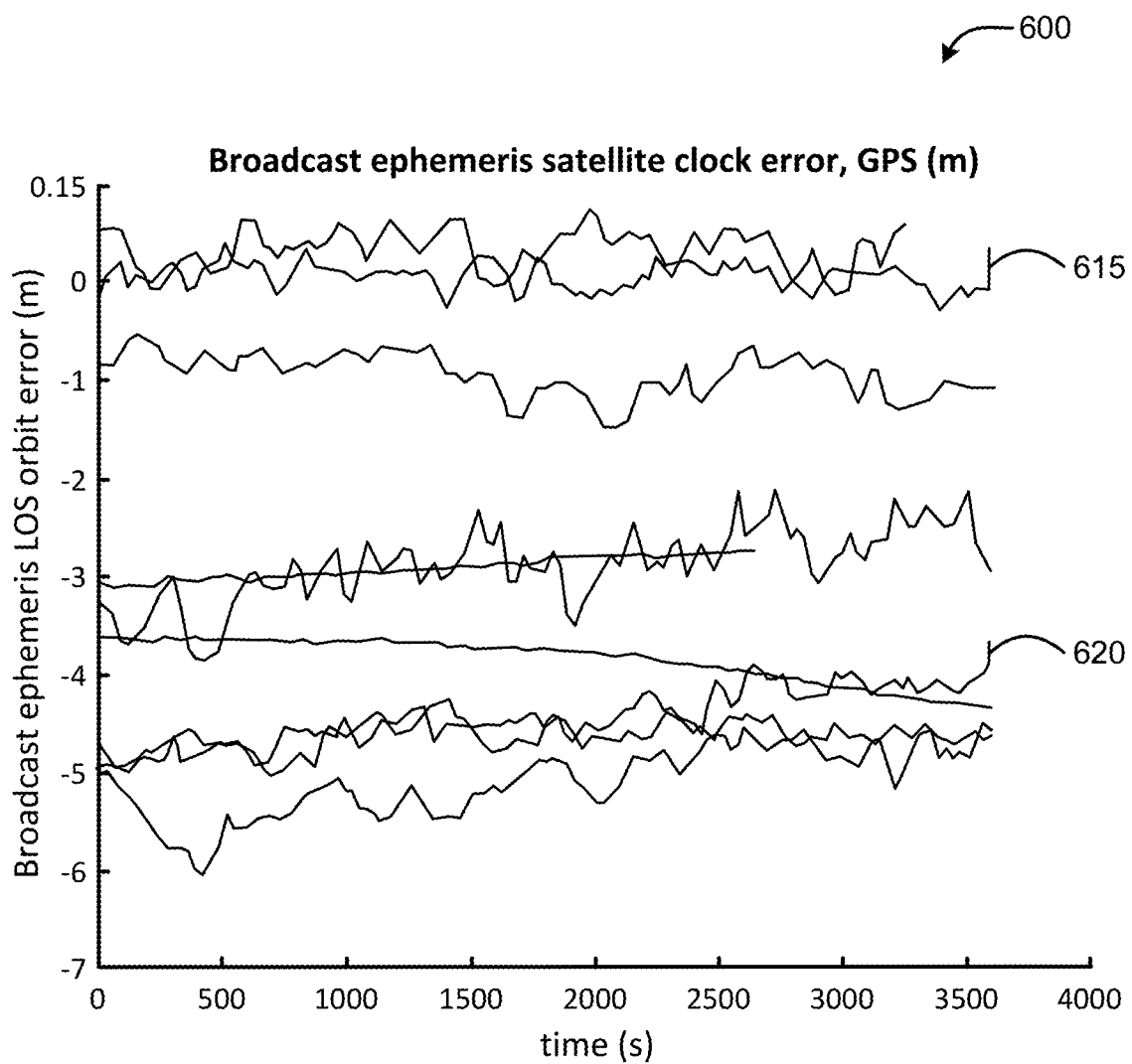

The value of the ambiguity adjustments (e.g., to the ambiguity dynamic and/or the ambiguity estimate term) can be based on off-line analysis of satellite orbit error, such as the analyses performed in conjunction with the graphs 400, 500, and 600 of FIGS. 4, 5, and 6. That is, the amount of adjustment in the ambiguity estimate term to allow for abrupt jumps (e.g., IODE jumps) in satellite clock and/or orbit error, and/or the amount of adjustment in the ambiguity dynamic to allow for abrupt jumps (e.g., IODE jumps) in satellite clock and/or orbit error, can be determined on a per-constellation and/or per-satellite basis by analyzing satellite clock and/or orbit error for the constellation/satellite over a period of time.

With regard to the ambiguity estimate term, it may be set based on an average, mean, etc. of the IODE jumps. Because IODE jumps in GAL are relatively smaller than those in GPS, the corresponding ambiguity estimate term to process signals from GAL satellites may be smaller. Additionally or alternatively, a User Range Accuracy (URA) provided by broadcast ephemeris can be used to set the value for the ambiguity estimate term.

An example of an ambiguity estimate term adjustment is provided hereafter with regard to Table 1 and Table 2.

TABLE 1

| | |
|---|---|
| Week, TOW | 2086, 306000 |
| GPS PRN | 31 |
| IODE-old | 390 |
| Example device position (m) | −5904746.156, 1041166.061, −2167696.787 |
| SV position truth with SP3 (m) | −15871628.151, −18406404.367, −10809982.496 |
| SV clock truth with SP3 (m) | 51724.607 |
| SV position with broadcast IODE-old (m) | −15871629.249, −18406402.939, −10809984.644 |
| SV clock with broadcast IODE-old (m) | 51724.452 |
| SV position error with broadcast IODE-old (m) (broadcast computed minus truth) | −1.097, 1.427, −2.148 |
| SV position error projected to line of sight (m) | 0.073 |
| SV clock error with broadcast IODE-old (m) (broadcast computed minus truth) | −0.155 |
| Total LOS error for broadcast orbit/ clock of IODE-old (m) | 0.228 |

TABLE 2

| | |
|---|---|
| Week, TOW | 2086, 306000 |
| GPS PRN | 31 |
| IODE-new | 392 |
| Example device position | −5904746.156, 1041166.061, −2167696.787 |
| SV position truth with SP3 | −15871628.151, −18406404.367, −10809982.496 |
| SV clock truth with SP3 | 51724.607 |
| SV position with broadcast IODE-new | −15871628.226, −18406404.983, −10809982.375 |
| SV clock with broadcast IODE-new | 51724.399 |
| SV position error with broadcast IODE-old (broadcast computed minus truth) | −0.074, −0.616, 0.120 |
| SV position error projected to line of sight | 0.496 |
| SV clock error with broadcast IODE-old (broadcast computed minus truth) | −0.208 |
| Total LOS error for broadcast orbit/clock of IODE-new (m) | 0.704 |

Table 1 and Table 2 provide various values for a GPS satellite before and after an IODE jump, respectively. Both tables provide satellite (SV) position and clock truth, broadcast satellite position and clock, and error. The total LOS error before the IODE jump is 0.228 m, as shown by Table 1. And the total LOS error after the IODE jump is 0.704 m, as shown by Table 2. The jump itself, therefore, is 0.476 m (0.704 m-0.228 m), which would be the amount of adjustment for the ambiguity estimate term.

Although embodiments thus far have been described with regard to GPS and GAL constellations, embodiments are not so limited. Alternative embodiments may perform the techniques described herein utilizing additional or alternative GNSS constellations. In some constellations, including GPS and GAL, embodiments may identify and remove data from satellites with a large orbit and/or clock error. Example of this is provided with regard to FIG. 7.

Figure 7:
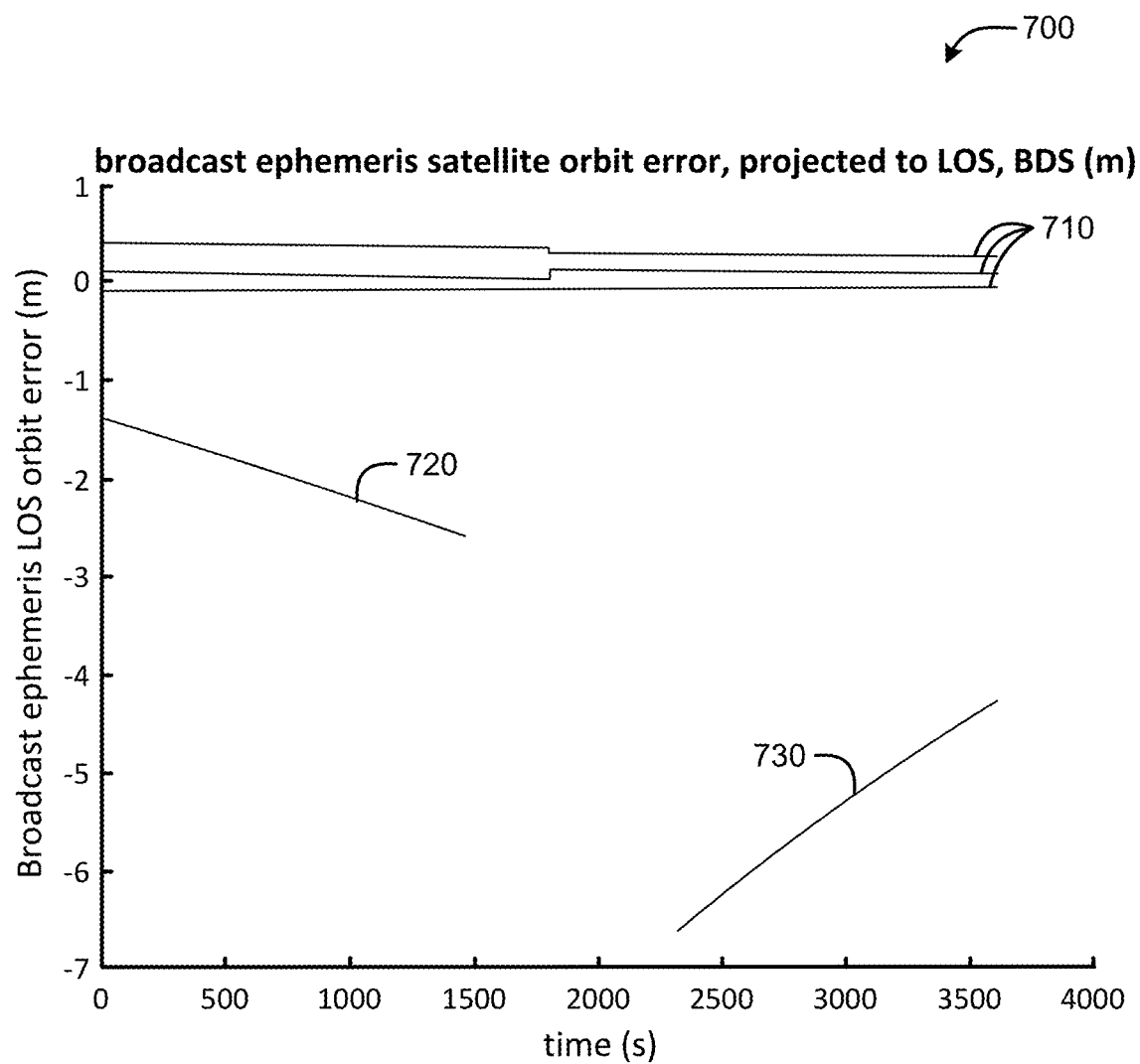

FIG. 7 is a graph 700 of satellite orbit error, similar to the graphs of FIGS. 4 and 5. Here, however, the satellite orbit error plotted is for BDS satellites. As shown by some plots 710, the satellite orbit error for several satellites is below half a meter, which is better than the satellite orbit error for many satellites in the GPS graph 400 of FIG. 4. However, as illustrated by plots 720 and 730, some specific satellites have a satellite orbit error that is much larger than other satellites. Further, the variation in the error may be substantial. The satellite orbit error shown in plot 730, for example, changes by over 2 m in approximately 22 minutes.

According to some embodiments, data from outlier satellites (e.g., satellites corresponding to plots 720 and 730) can be excluded from a position estimate using the modified PPP techniques provided herein. This can be done, for example, by obtaining satellite orbit error information at the GNSS receiver from a server, such as through the GNSS Assistance Service and/or gpsOneXTRA Assistance ("XTRA") provided by Qualcomm Technologies, Inc. Obtaining this information can be done via the Internet, for example, using a wireless connection of the mobile device, such as cellular (Long-Term Evolution (LTE), 5G, etc.), Wi-Fi, or the like. The server can compute this information based on data from one or more stationary reference stations, having known (e.g., precisely pre-surveyed) positions. For example, the server may, in real-time operation, determine Pseudo-Range (PR) residuals for a satellite by removing the geometry range computed with the known position of a reference station and the broadcast ephemeris for the satellite. If such PR residuals are significantly larger than other SVs (e.g., vary from average PR residuals by a threshold amount), this can be evidence of an outlier satellite orbit error, in which case the satellite may be identified by the server. The server can then pass this information to the GNSS receiver. According to some embodiments, this information may be broadcast by access points and/or base stations of a wireless network (e.g., gNB base stations of a 5G wireless broadband network).

According to some embodiments, data from outlier satellites can be excluded without the need for assistance from a server by implementing sophisticated orbit integration techniques at the GNSS receiver (or mobile device into which the GNSS receiver is integrated) to compute the orbit variation and/or clock over time. This can be used to cross check the values determined through broadcast satellite orbit and/or clock information. In such embodiments, if an offset between values determined by the computed orbit and/or clock variation and the broadcast orbit and/or clock variation exceed a threshold amount, the broadcast orbit and/or clock information can be disregarded.

Again, the ambiguity can be adapted to accommodate a change in satellite orbit and/or clock error over time, e.g., error "drift," by means of adjusting an ambiguity dynamic of the PPP engine (e.g., in addition or as an alternative to adjusting the ambiguity estimate term to accommodate IODE jumps as previously described). An example of accommodating a change in satellite orbit and/or clock error over time is described with regard to FIG. 8.

Figure 8:
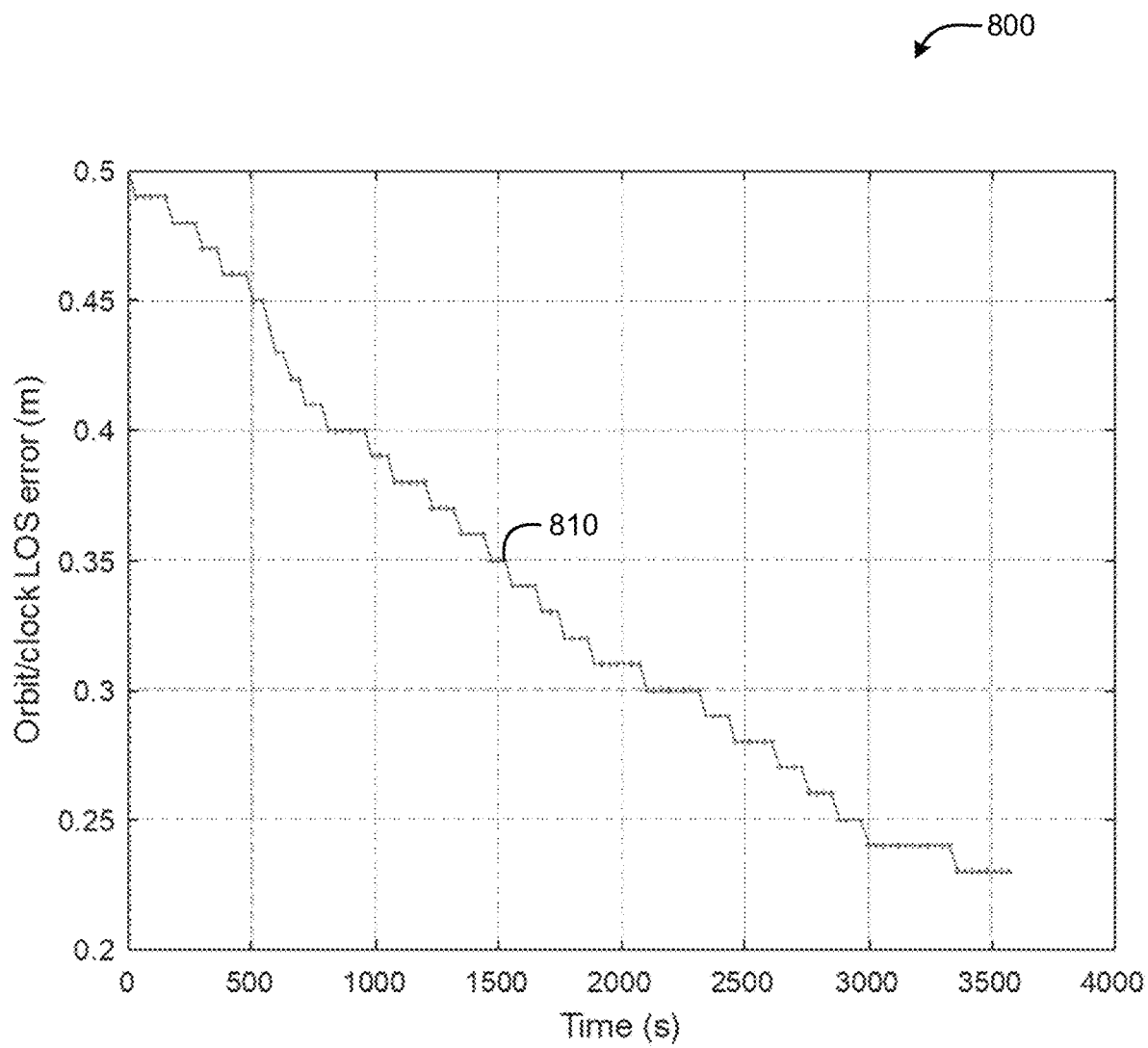
FIG. 8 is a graph of example satellite orbit and clock line-of-sight (LOS) error over time, illustrating an example of error drift.

FIG. 8 is a graph 800 of example satellite orbit and clock LOS error over time. As with the graphs of FIGS. 4-7, the graph 800 plots error over the course of approximately one hour. Here, however, a single plot 810 is provided for simplicity. As can be seen, the error varies from 0.5 m to 0.23 m.

According to some embodiments, a GNSS receiver may employ ambiguity dynamic adoption logic to mitigate the impact of this change in satellite orbit/clock LOS error. This logic can determine a rate of error change and adopt the ambiguity dynamic of the PPP engine accordingly. The plot 810 of graph 800, the 27 cm change from 0.5 m to 0.23 m occurs approximately linearly. Ambiguity dynamic adoption logic may identify this trend in satellite orbit and/or clock error for the plot 810, ambiguity dynamic adoption logic may approximately compute the orbit/clock LOS error as having a drift velocity of 0.0075 cm/s. Using this drift velocity, the PPP engine can then add this error drift velocity to the ambiguity dynamic estimated for the satellite corresponding to the plot 810.

It the ambiguity dynamic adoption logic may vary depending on desired functionality. For example, according to some embodiments the ambiguity dynamic adoption logic may be able to approximate nonlinear curvature in the rate of error change over time. This may be done, for example, finding a best fit of the data to one of a plurality of lines and/or curves that approximate the rate of error change over time (e.g., by using least squares fitting).

Figure 9:
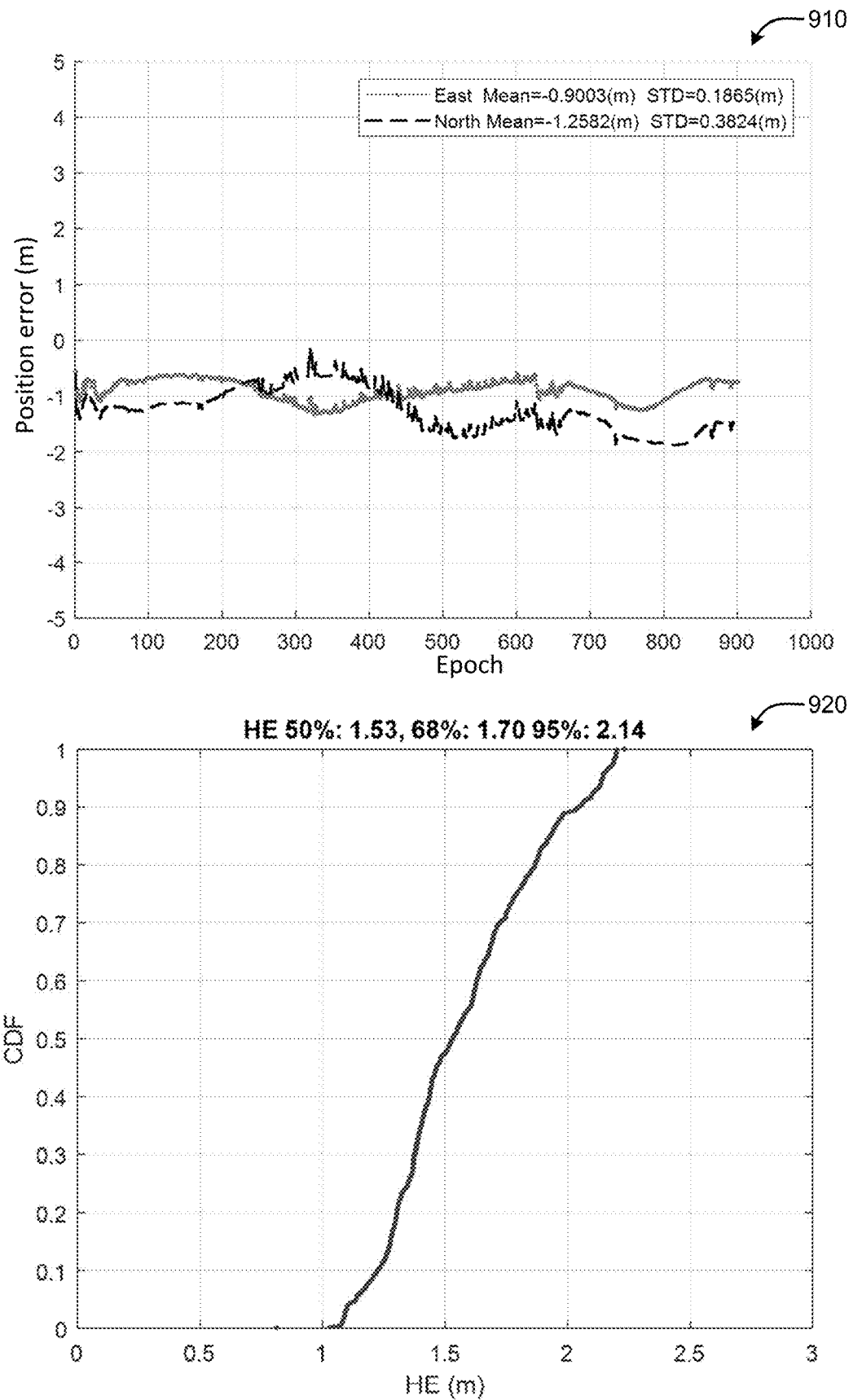
FIG. 9 includes graphs that show test results from a traditional GNSS positioning utilizing an Standalone Positioning Engine (SPE).
Figure 10:
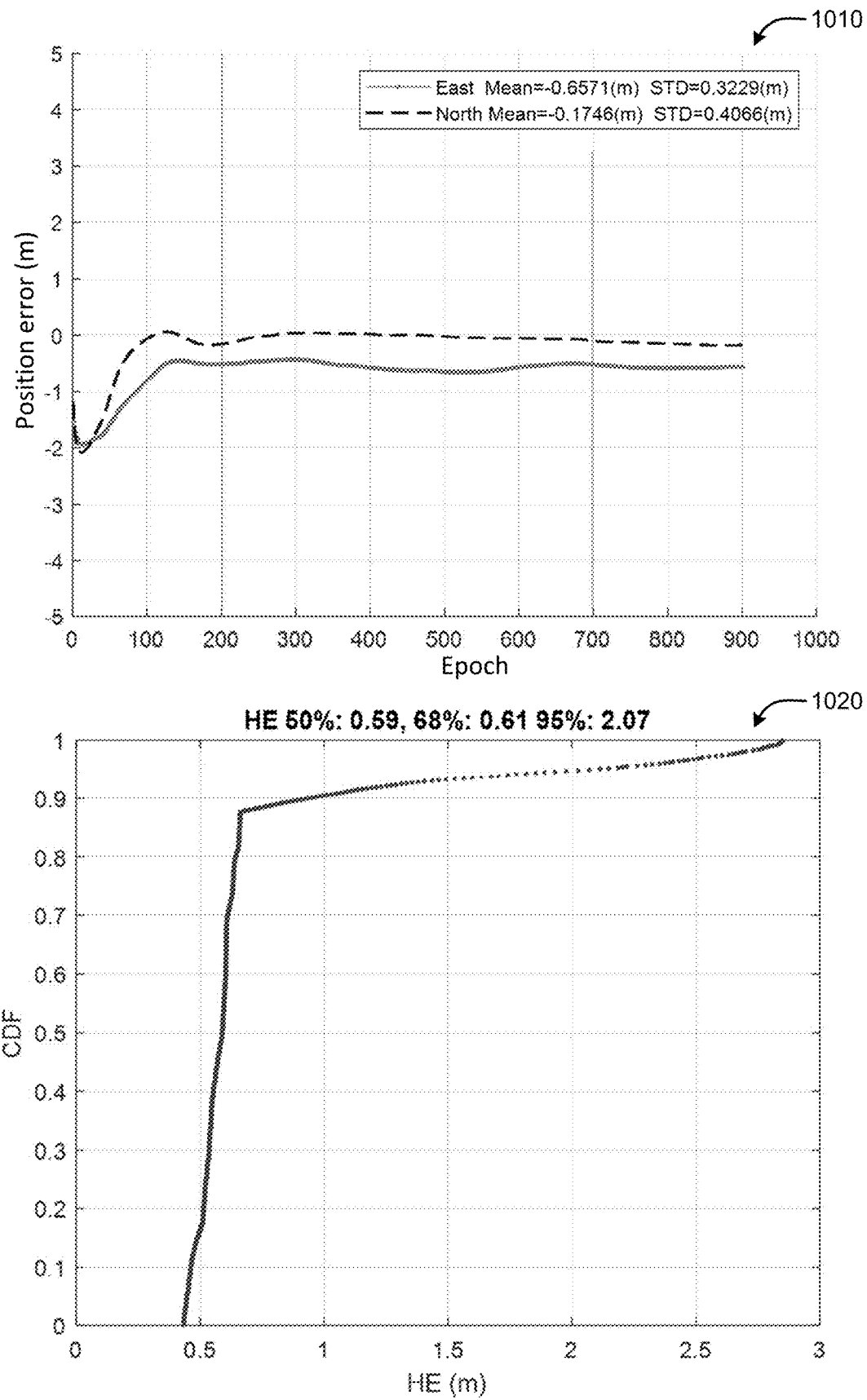
FIG. 10 includes graphs similar to those in FIG. 9, but showing test results from an embodiment of a modified PPP positioning technique that utilizes broadcast ephemeris, as described herein.

FIGS. 9 and 10 provide various graphs that show a comparison of results from traditional GNSS positioning with those from a prototype that implements an embodiment of the modified PPP positioning described herein.

FIG. 9 includes graphs that show test results from a traditional GNSS positioning utilizing an SPE (where no carrier phase is being used). A first graph 910 plots position error for the test for East and North in an East, North, Up (ENU) coordinate frame over time (approximately 900 epochs, where each epoch is one second). A second graph 920 shows a corresponding Cumulative Distribution Function (CDF) of horizontal error (HE) for the test. As can be seen from the first graph 910, position error varies between approximately 0.2 m and −1.8 m. Further, as shown by the second graph 920, 50% of the HE error values are greater than 1.53 m, and 5% are greater than 2.14 m.

FIG. 10 includes graphs similar to those in FIG. 9, but showing test results from an embodiment of a modified PPP positioning technique that utilizes broadcast ephemeris, as described herein. A first graph 1010 plots position error for the test for East and North in an East, North, Up (ENU) coordinate frame over time. A second graph 1020 shows a corresponding CDF of HE for the test. In that the first graph 1010, position error starts relatively high (between approximately −1 m and −2 m). However, it becomes more accurate as the PPP engine converges, which takes approximately 120 seconds. After that, horizontal error primarily remains between 0 m and −0.5 m. Further, as shown by the second graph 920, 50% of the HE error values are less than 0.59 m (far less than the corresponding SPE, as shown by graph 920 of FIG. 9), and 5% are greater than 2.07 m. Thus, the embodiment utilizing a modified PPP positioning technique as described herein provides higher accuracy with more consistency than the traditional SPE. It can be noted that if IODE changes are not handled (e.g., by adjusting the ambiguity estimate term in the manner described herein), position degradation may occur.

Figure 11:
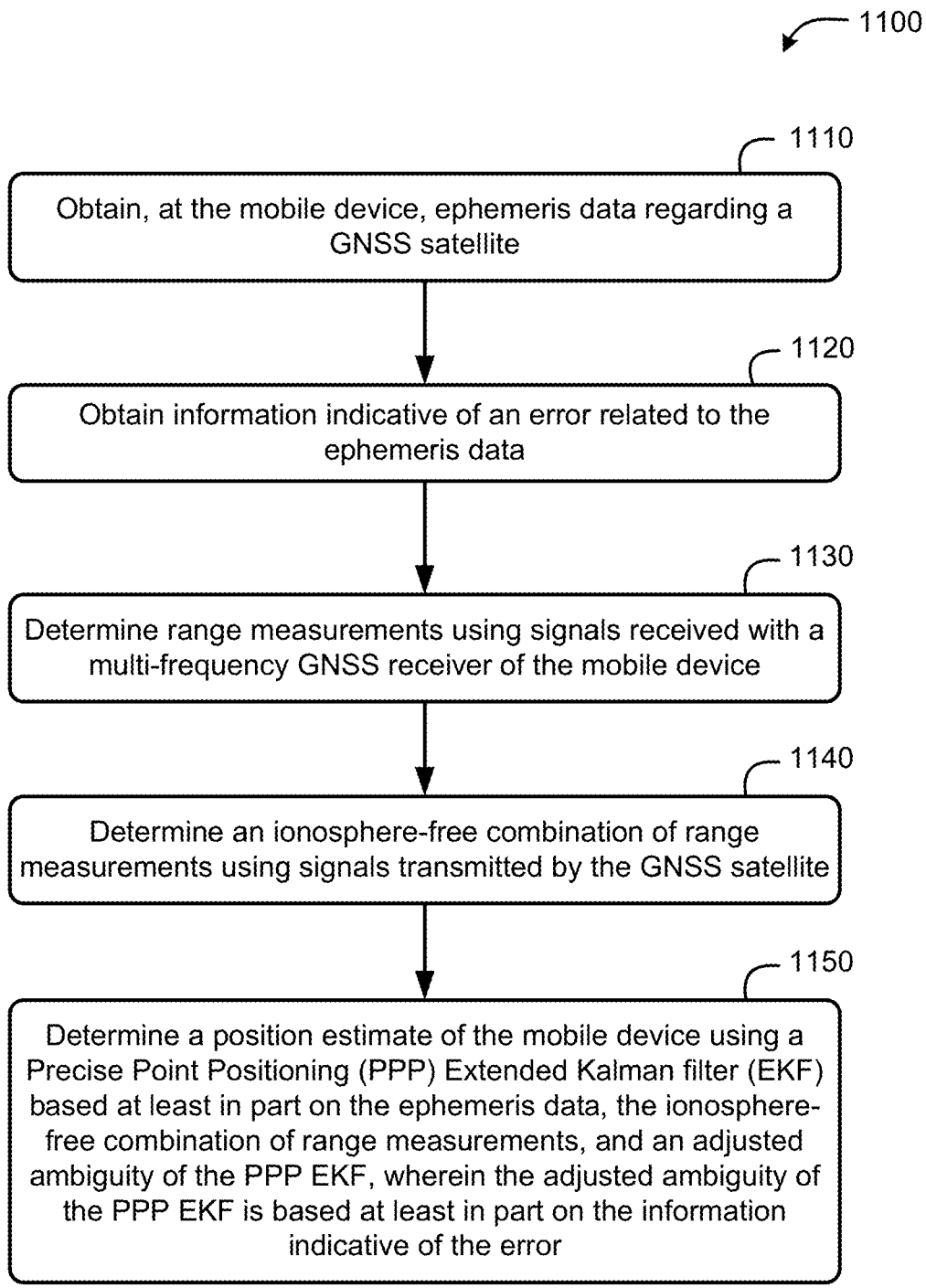
FIG. 11 is a flow diagram of a method of GNSS-based positioning of a mobile device, according to an embodiment.

FIG. 11 is a flow diagram of a method 1100 of GNSS-based positioning of a mobile device, according to an embodiment. In this method 1100, a modified PPP positioning technique utilizing broadcast ephemeris is used, as described above. Means for performing the functionality illustrated in one or more of the blocks shown in FIG. 11 may be performed by hardware and/or software components of a GNSS receiver and/or a mobile device comprising a GNSS receiver. Example components of a mobile device are illustrated in FIG. 12, which are described in more detail below.

At block 1110, the functionality comprises obtaining, with a multi-frequency GNSS receiver at the mobile device, ephemeris data regarding a GNSS satellite. As described in the embodiments above, the ephemeris data may comprise broadcast ephemeris data, which can include satellite orbit and clock data that can be used to determine a PPP solution utilizing a modified PPP technique as described herein. According to some embodiments, ephemeris data may be obtained via a WWAN (e.g., via one or more broadcast, multicast, or unicast transmissions from a wireless network entity, such as a base station or other wireless device in communication with WWAN). Depending on desired functionality, the ephemeris data may comprise ephemeris data that is broadcast from the GNSS satellite and relayed by the WWAN and/or ephemeris data that is maintained by a separate service (e.g., a mobile broadband provider, a GNSS service provider, government agency, etc.).

Figure 12:
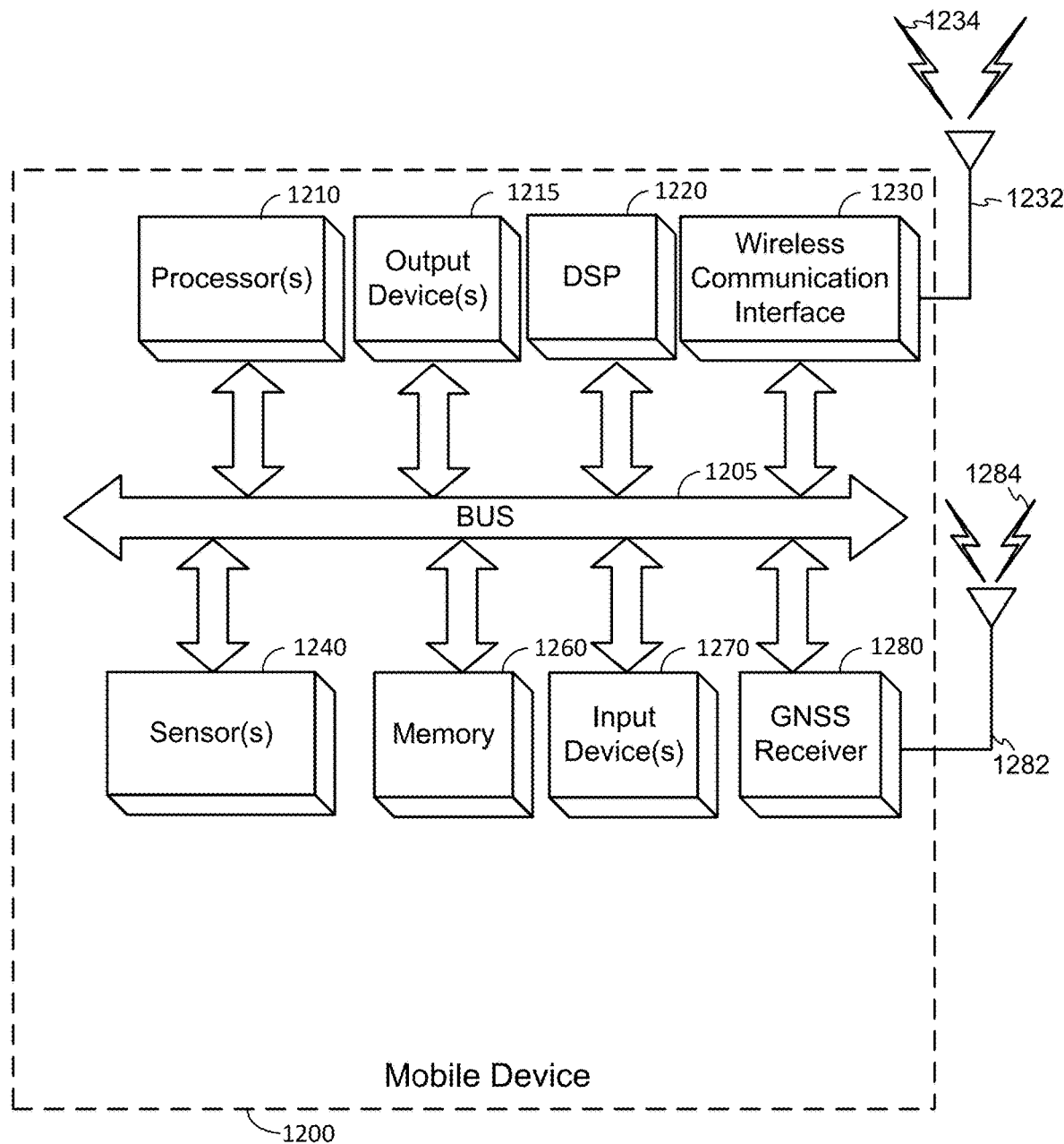
FIG. 12 is a block diagram of various hardware and software components of a mobile device 1200, according to an embodiment.

Means for performing functionality at block 1110 may comprise a bus 1205, processor(s) 1210, DSP 1220, memory 1260, GNSS receiver 1280, and/or other components of a mobile device 1200 as illustrated in FIG. 12.

At block 1120, the functionality comprises obtaining information indicative of an error related to the ephemeris data. As noted in the previously described embodiments, the information indicative of the error may comprise information indicative of a change in orbital error, clock error, or both. Moreover, this can be provided by a server and/or determined (e.g., calculated) by the mobile device itself. According to some embodiments of the method 1100, obtaining the information indicative of the error may comprise computing orbit variation of the GNSS satellite over time. According to some embodiments of the method 1100, obtaining the information indicative of the error may comprise receiving the information indicative of an error at the mobile device from a server.

Means for performing functionality at block 1120 may comprise a bus 1205, processor(s) 1210, DSP 1220, memory 1260, GNSS receiver 1280, and/or other components of a mobile device 1200 as illustrated in FIG. 12.

At block 1130, the functionality comprises determining range measurements using signals received with a multi-frequency GNSS receiver of the mobile device. As described with regard to blocks 210, 215, and 220, range measurements can be made using a multi-band PR and/or CP measurement of the signals transmitted by the GNSS satellite. Means for performing functionality at block 1130 may comprise a bus 1205, processor(s) 1210, DSP 1220, memory 1260, GNSS receiver 1280, and/or other components of a mobile device 1200 as illustrated in FIG. 12.

At block 1140, the functionality comprises determining an ionosphere-free combination of range measurements using signals transmitted by the GNSS satellite. As previously noted, multi-frequency GNSS receivers enable ionosphere-free combinations of range measurements. Thus, embodiments may utilize these types of combinations. Means for performing functionality at block 1140 may comprise a bus 1205, processor(s) 1210, DSP 1220, memory 1260, GNSS receiver 1280, and/or other components of a mobile device 1200 as illustrated in FIG. 12.

At block 1150, the functionality comprises determining a position estimate of the mobile device using a PPP EKF based at least in part on the ephemeris data, the ionosphere-free combination of range measurements, and an adjusted ambiguity of the PPP EKF, wherein the adjusted ambiguity of the PPP KF is based at least in part on the information indicative of the error. As noted in the embodiments described herein, the adjusted ambiguity of the PPP EKF may comprise an ambiguity dynamic and/or an ambiguity estimate term, which may take into account the amount of change in the error, which may be based on the error source. For example, according to some embodiments, the change in orbital error, clock error, or both may be due to an IODE change. In such embodiments, the adjusted ambiguity of the PPP EKF may comprise an ambiguity estimate term, and the ambiguity estimate term may be adjusted based on a difference in an LOS error before the IODE change and after the IODE change, wherein the LOS error is due to the orbital error, the clock error, or both. Additionally or alternatively, as noted with regard to FIG. 8, the information indicative of the error may comprise a rate of change of an LOS error, wherein the LOS error is due to the orbital error, the clock error, or both, and the adjusted ambiguity of the PPP EKF may comprise an ambiguity dynamic, and the ambiguity dynamic may be adjusted based on the rate of change of the LOS error. Again, this rate of change may be determined by a server or by the mobile device.

Means for performing functionality at block 1130 may comprise a bus 1205, processor(s) 1210, DSP 1220, memory 1260, GNSS receiver 1280, and/or other components of a mobile device 1200 as illustrated in FIG. 12.

According to some embodiments, one or more additional functions may be performed, as noted in the above-described embodiments. For example, some embodiments may further comprise receiving additional information at the mobile device from a server, wherein the additional information indicates a second error exceeds a threshold, wherein the second error is related to second ephemeris data regarding a second GNSS satellite and broadcast from the second GNSS satellite. Such embodiments may further comprise, responsive to receiving the additional information, excluding the second ephemeris data when determining the position estimate of the mobile device. As noted previously with regard to FIG. 7, a server may provide a flag or other indication that one or more satellites has an error that exceeds a threshold (e.g., an absolute error threshold and/or an error rate-of-change threshold). Thus, according to some embodiments of the method 1100, the second error may comprise an LOS error due to orbital error, clock error, or both, in the second ephemeris data, and the threshold may comprise a threshold in a rate of change of the LOS error.

FIG. 12 is a block diagram of various hardware and software components of a mobile device 1200, according to an embodiment. These components can be utilized as described herein above (e.g. in association with FIGS. 1-11). For example, the mobile device 1200 can perform the operations of the method illustrated in FIG. 11, and/or one or more of the functions of a GNSS receiver as described in the embodiments herein. It should be noted that FIG. 12 is meant only to provide a generalized illustration of various components, any or all of which may be utilized as appropriate. As previously noted, mobile device 1200 may vary in form and function, and may ultimately comprise any GNSS-enabled device, including vehicles, commercial and consumer electronic devices, survey equipment, and more. Thus, in some instances, components illustrated by FIG. 12 can be localized to a single physical device and/or distributed among various networked devices, which may be disposed at different physical locations (e.g., different locations of a vehicle). It can be further noted that reference stations may utilize hardware and/or software components similar to the mobile device 1200.

The mobile device 1200 is shown comprising hardware elements that can be electrically coupled via a bus 1205 (or may otherwise be in communication, as appropriate). The hardware elements may include a processor(s) 1210 which can include without limitation one or more general-purpose processors, one or more special-purpose processors (such as DSP chips, graphics processors (GPUs), application specific integrated circuits (ASICs), and/or the like), and/or other processor, processing structure, processing unit, or processing means. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The mobile device 1200 also can include one or more input devices 1270, which can include without limitation a keyboard, touch screen, a touch pad, microphone, button(s), dial(s), switch(es), and/or the like; and one or more output devices 1215, which can include without limitation a display, light emitting diode (LED), speakers, and/or the like. As will be appreciated, the type of input devices 1270 and output devices 1215 may depend on the type of mobile device 1200 with which the input devices 1270 and output devices 1215 are integrated.

The mobile device 1200 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 1200 to communicate via networks and/or directly with other devices as described herein. The wireless communication interface 1230 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 1232 that send and/or receive wireless signals 1234. The antenna(s) 1232 may comprise one or more discrete antennas, one or more antenna arrays, or any combination.

Depending on desired functionality, the wireless communication interface 1230 may comprise separate transceivers, a separate receiver and transmitter, or any combination of transceivers, transmitters, and/or receivers to communicate with base stations and other terrestrial transceivers, such as wireless devices and access points. The mobile device 1200 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 1200 can further include sensor(s) 1240. Sensors 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the mobile device 1200 may also include a GNSS receiver 1280 capable of receiving signals 1284 from one or more GNSS satellites (e.g., satellites 130) as described herein using an antenna 1282 (which could be the same as antenna 1232). The GNSS receiver 1280 can extract a position of the mobile device 1200, using conventional techniques, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 1280 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 illustrated in FIG. 12 is illustrated as a component distinct from other components within a mobile device 1200, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem). A GNSS receiver may optionally also include a positioning engine, such as those described herein (e.g., a KF, Weighted Least Squares (WLS), hatch filter, particle filter, etc.), which can use GNSS measurements from the measurement engine and other PPP processing logic and/or data (e.g., as described with regard to FIG. 2) to determine a position of the GNSS receiver. The positioning engine may also be executed by one or more processors, such as processor(s) 1210 and/or DSP 1220.

The mobile device 1200 may further include and/or be in communication with a memory 1260. The memory 1260 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile device 1200 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile device 1200 (and/or processor(s) 1210 or DSP 1220 within mobile device 1200). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure as defined by the appended claims. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of Global Navigation Satellite Systems (GNSS)-based positioning of a mobile device, the method comprising: obtaining, at the mobile device, ephemeris data regarding a GNSS satellite; obtaining information indicative of an error related to the ephemeris data; determining range measurements using signals received with a multi-frequency GNSS receiver of the mobile device; determining an ionosphere-free combination of range measurements using signals transmitted by the GNSS satellite; and determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

Clause 2. The method of clause 1, wherein the information indicative of the error comprises information indicative of a change in orbital error, clock error, or both.

Clause 3. The method of clause 2 wherein the change in orbital error, clock error, or both is due to an Issue Of Data Ephemeris (IODE) change.

Clause 4. The method of clause 3 wherein the adjusted ambiguity of the PPP EKF comprises an ambiguity estimate term, and wherein the ambiguity estimate term is adjusted based on a difference in a Line-Of-Sight (LOS) error before the IODE change and after the IODE change, wherein the LOS error is due to the orbital error, the clock error, or both.

Clause 5. The method of any of clauses 2-4 wherein the information indicative of the error comprises a rate of change of an LOS error, wherein the LOS error is due to the orbital error, the clock error, or both, and the adjusted ambiguity of the PPP EKF comprises an ambiguity dynamic, and wherein the ambiguity dynamic is adjusted based on the rate of change of the LOS error.

Clause 6. The method of any of clauses 1-5 wherein obtaining the information indicative of the error comprises computing orbit variation of the GNSS satellite over time.

Clause 7. The method of any of clauses 1-6 wherein obtaining the information indicative of the error comprises receiving the information indicative of an error at the mobile device from a server.

Clause 8. The method of any of clauses 1-7 further comprising receiving additional information at the mobile device from a server, wherein the additional information indicates a second error exceeds a threshold, wherein the second error is related to second ephemeris data regarding a second GNSS satellite; and responsive to receiving the additional information, excluding the second ephemeris data when determining the position estimate of the mobile device.

Clause 9. The method of clause 8 further wherein the second error comprises an LOS error due to orbital error, clock error, or both, in the second ephemeris data; and the threshold comprises a threshold in a rate of change of the LOS error.

Clause 10. A mobile device for performing Global Navigation Satellite Systems (GNSS)-based positioning of the mobile device, the mobile device comprising: a multi-frequency GNSS receiver; a memory; and one or more processors communicatively coupled with the multi-frequency GNSS receiver and the memory, wherein the one or more processors are configured to: obtain, with the multi-frequency GNSS receiver, ephemeris data regarding a GNSS satellite; obtain information indicative of an error related to the ephemeris data; determine range measurements using signals received with the multi-frequency GNSS receiver; determine an ionosphere-free combination of range measurements using signals transmitted by the GNSS satellite; and determine a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

Clause 11. The mobile device of clause 10, wherein, to determine the position estimate, the one or more processors are configured to use information indicative of a change in orbital error, clock error, or both as the information indicative of the error.

Clause 12. The mobile device of clause 11 wherein the change in orbital error, clock error, or both is due to an Issue Of Data Ephemeris (IODE) change.

Clause 13. The mobile device of clause 12 wherein to determine the position estimate, the one or more processors are configured to determine the adjusted ambiguity of the PPP EKF by adjusting an ambiguity estimate term as the ambiguity of the PPP EKF; and the one or more processors are configured to adjust the ambiguity estimate term based on a difference in a Line-Of-Sight (LOS) error before the IODE change and after the IODE change, wherein the LOS error is due to the orbital error, the clock error, or both.

Clause 14. The mobile device of any of clauses 11-13 wherein to obtain information indicative of an error, the one or more processors are configured to obtain a rate of change of an LOS error, wherein the LOS error is due to the orbital error, the clock error, or both, and the one or more processors are configured to determine the adjusted ambiguity of the PPP EKF by adjusting an ambiguity dynamic based on the rate of change of the LOS error.

Clause 15. The mobile device of any of clauses 10-14 wherein, to obtain the information indicative of the error, the one or more processors are configured to compute orbit variation of the GNSS satellite over time.

Clause 16. The mobile device of any of clauses 10-15 wherein, to obtain the information indicative of the error, the one or more processors are configured to receive the information indicative of an error at the mobile device from a server.

Clause 17. The mobile device of any of clauses 10-16 wherein the one or more processors are further configured to: receive additional information at the mobile device from a server, wherein the additional information indicates a second error exceeds a threshold, wherein the second error is related to second ephemeris data regarding a second GNSS satellite; and responsive to receiving the additional information, exclude the second ephemeris data when determining the position estimate of the mobile device.

Clause 18. The mobile device of clause 17 further wherein the second error comprises an LOS error due to orbital error, clock error, or both, in the second ephemeris data; and the threshold comprises a threshold in a rate of change of the LOS error.

Clause 19. An apparatus for Global Navigation Satellite Systems (GNSS)-based positioning of a mobile device, the apparatus comprising: means for obtaining, at the mobile device, ephemeris data regarding a GNSS satellite; means for obtaining information indicative of an error related to the ephemeris data; means for determining range measurements using signals received with a multi-frequency GNSS receiver of the mobile device; means for determining an ionosphere-free combination of range measurements using signals transmitted by the GNSS satellite; and means for determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

Clause 20. The apparatus of clause 19, wherein means for determining the position estimate comprise means for using information indicative of a change in orbital error, clock error, or both as the information indicative of the error.

Clause 21. The apparatus of clause 20 wherein the change in orbital error, clock error, or both is due to an Issue Of Data Ephemeris (IODE) change.

Clause 22. The apparatus of clause 21 wherein the means for determining the position estimate comprise means for determining the adjusted ambiguity of the PPP EKF at least in part by adjusting an ambiguity estimate term based on a difference in a Line-Of-Sight (LOS) error before the IODE change and after the IODE change, wherein the LOS error is due to the orbital error, the clock error, or both.

Clause 23. The apparatus of any of clauses 20-22 wherein the means for obtaining the information indicative of the error comprises means for obtaining a rate of change of an LOS error, wherein the LOS error is due to the orbital error, the clock error, or both, and the means for determining the position estimate comprise means for determining the adjusted ambiguity of the PPP EKF at least in part by adjusting an ambiguity dynamic based on the rate of change of the LOS error.

Clause 24. The apparatus of any of clauses 19-23 wherein the means for obtaining the information indicative of the error comprises means for computing orbit variation of the GNSS satellite over time.

Clause 25. The apparatus of any of clauses 19-24 wherein the means for obtaining the information indicative of the error comprises means for receiving the information indicative of an error at the mobile device from a server.

Clause 26. The apparatus of any of clauses 19-25 further comprising means for receiving additional information at the mobile device from a server, wherein the additional information indicates a second error exceeds a threshold, wherein the second error is related to second ephemeris data regarding a second GNSS satellite; and means for, responsive to receiving the additional information, excluding the second ephemeris data when determining the position estimate of the mobile device.

Clause 27. The apparatus of any of clauses 19-26 further wherein the second error comprises an LOS error due to orbital error, clock error, or both, in the second ephemeris data; and the threshold comprises a threshold in a rate of change of the LOS error.

Clause 28. A non-transitory computer-readable medium storing instructions for Global Navigation Satellite Systems (GNSS)-based positioning of a mobile device, the instructions comprising code for: obtaining at the mobile device, ephemeris data regarding a GNSS satellite; obtaining information indicative of an error related to the ephemeris data; determining range measurements using signals received with a multi-frequency GNSS receiver of the mobile device; determining an ionosphere-free combination of range measurements using signals transmitted by the GNSS satellite; and determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

Clause 29. The computer-readable medium of clause 28, wherein the code for obtaining the information indicative of the error comprises code for computing orbit variation of the GNSS satellite over time.

Clause 30. The computer-readable medium of any of clauses 28-29 wherein the code for obtaining the information indicative of the error comprises code for receiving the information indicative of an error at the mobile device from a server.

What is claimed is:

1. A method of Global Navigation Satellite Systems (GNSS)-based positioning of a mobile device, the method comprising:
obtaining, at the mobile device, ephemeris data regarding a GNSS satellite;
obtaining information indicative of an error related to the ephemeris data;
determining range measurements using signals received with a multi-frequency GNSS receiver of the mobile device;
determining an ionosphere-free combination of range measurements using signals transmitted by the GNSS satellite; and
determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

2. The method of claim 1, wherein the information indicative of the error comprises information indicative of a change in orbital error, clock error, or both.

3. The method of claim 2, wherein the change in orbital error, clock error, or both is due to an Issue Of Data Ephemeris (IODE) change.

4. The method of claim 3, wherein the adjusted ambiguity of the PPP EKF comprises an ambiguity estimate term, and wherein the ambiguity estimate term is adjusted based on a difference in a Line-Of-Sight (LOS) error before the IODE change and after the IODE change, wherein the LOS error is due to the orbital error, the clock error, or both.

5. The method of claim 2, wherein:
the information indicative of the error comprises a rate of change of an LOS error, wherein the LOS error is due to the orbital error, the clock error, or both, and
the adjusted ambiguity of the PPP EKF comprises an ambiguity dynamic, and wherein the ambiguity dynamic is adjusted based on the rate of change of the LOS error.

6. The method of claim 1, wherein obtaining the information indicative of the error comprises computing orbit variation of the GNSS satellite over time, and
wherein the method further comprises:
determining a rate of error change in at least one of a satellite orbit Line-Of-Sight (LOS) error or a clock error; and
adopting the adjusting ambiguity based on the rate of error change.

7. The method of claim 1, wherein obtaining the information indicative of the error comprises receiving the information indicative of an error at the mobile device from a server.

8. The method of claim 1, further comprising:
receiving additional information at the mobile device from a server, wherein the additional information indicates a second error exceeds a threshold, wherein the second error is related to second ephemeris data regarding a second GNSS satellite; and
responsive to receiving the additional information, excluding the second ephemeris data when determining the position estimate of the mobile device.

9. The method of claim 8, further wherein:
the second error comprises an LOS error due to orbital error, clock error, or both, in the second ephemeris data; and
the threshold comprises a threshold in a rate of change of the LOS error.

10. A mobile device for performing Global Navigation Satellite Systems (GNSS)-based positioning of the mobile device, the mobile device comprising:
a multi-frequency GNSS receiver;
a memory; and
one or more processors communicatively coupled with the multi-frequency GNSS receiver and the memory, wherein the one or more processors are configured to:
obtain, with the multi-frequency GNSS receiver, ephemeris data regarding a GNSS satellite;
obtain information indicative of an error related to the ephemeris data;
determine range measurements using signals received with the multi-frequency GNSS receiver;
determine an ionosphere-free combination of range measurements using signals transmitted by the GNSS satellite; and
determine a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

11. The mobile device of claim 10, wherein, to determine the position estimate, the one or more processors are configured to use information indicative of a change in orbital error, clock error, or both as the information indicative of the error.

12. The mobile device of claim 11, wherein the change in orbital error, clock error, or both is due to an Issue Of Data Ephemeris (IODE) change.

13. The mobile device of claim 12, wherein:
to determine the position estimate, the one or more processors are configured to determine the adjusted ambiguity of the PPP EKF by adjusting an ambiguity estimate term as the ambiguity of the PPP EKF; and
the one or more processors are configured to adjust the ambiguity estimate term based on a difference in a Line-Of-Sight (LOS) error before the IODE change and after the IODE change, wherein the LOS error is due to the orbital error, the clock error, or both.

14. The mobile device of claim 11, wherein:
to obtain information indicative of an error, the one or more processors are configured to obtain a rate of change of an LOS error, wherein the LOS error is due to the orbital error, the clock error, or both, and
the one or more processors are configured to determine the adjusted ambiguity of the PPP EKF by adjusting an ambiguity dynamic based on the rate of change of the LOS error.

15. The mobile device of claim 10, wherein, to obtain the information indicative of the error, the one or more processors are configured to compute orbit variation of the GNSS satellite over time.

16. The mobile device of claim 10, wherein, to obtain the information indicative of the error, the one or more processors are configured to receive the information indicative of an error at the mobile device from a server.

17. The mobile device of claim 10, wherein the one or more processors are further configured to:
receive additional information at the mobile device from a server, wherein the additional information indicates a second error exceeds a threshold, wherein the second error is related to second ephemeris data regarding a second GNSS satellite; and
responsive to receiving the additional information, exclude the second ephemeris data when determining the position estimate of the mobile device.

18. The mobile device of claim 17, further wherein:
the second error comprises an LOS error due to orbital error, clock error, or both, in the second ephemeris data; and
the threshold comprises a threshold in a rate of change of the LOS error.

19. An apparatus for Global Navigation Satellite Systems (GNSS)-based positioning of a mobile device, the apparatus comprising:
means for obtaining, at the mobile device, ephemeris data regarding a GNSS satellite;

means for obtaining information indicative of an error related to the ephemeris data;

means for determining range measurements using signals received with a multi-frequency GNSS receiver of the mobile device;

means for determining an ionosphere-free combination of range measurements using signals transmitted by the GNSS satellite; and means for determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

20. The apparatus of claim 19, wherein means for determining the position estimate comprise means for using information indicative of a change in orbital error, clock error, or both as the information indicative of the error.

21. The apparatus of claim 20, wherein the change in orbital error, clock error, or both is due to an Issue Of Data Ephemeris (IODE) change.

22. The apparatus of claim 21, wherein the means for determining the position estimate comprise means for determining the adjusted ambiguity of the PPP EKF at least in part by adjusting an ambiguity estimate term based on a difference in a Line-Of-Sight (LOS) error before the IODE change and after the IODE change, wherein the LOS error is due to the orbital error, the clock error, or both.

23. The apparatus of claim 20, wherein:
the means for obtaining the information indicative of the error comprises means for obtaining a rate of change of an LOS error, wherein the LOS error is due to the orbital error, the clock error, or both, and the means for determining the position estimate comprise means for determining the adjusted ambiguity of the PPP EKF at least in part by adjusting an ambiguity dynamic based on the rate of change of the LOS error.

24. The apparatus of claim 19, wherein the means for obtaining the information indicative of the error comprises means for computing orbit variation of the GNSS satellite over time.

25. The apparatus of claim 19, wherein the means for obtaining the information indicative of the error comprises means for receiving the information indicative of an error at the mobile device from a server.

26. The apparatus of claim 19, further comprising:
means for receiving additional information at the mobile device from a server, wherein the additional information indicates a second error exceeds a threshold, wherein the second error is related to second ephemeris data regarding a second GNSS satellite; and means for, responsive to receiving the additional information, excluding the second ephemeris data when determining the position estimate of the mobile device.

27. The apparatus of claim 26, further wherein:
the second error comprises an LOS error due to orbital error, clock error, or both, in the second ephemeris data; and the threshold comprises a threshold in a rate of change of the LOS error.

28. A non-transitory computer-readable medium storing instructions for Global Navigation Satellite Systems (GNSS)-based positioning of a mobile device, the instructions comprising code for:
obtaining at the mobile device, ephemeris data regarding a GNSS satellite;

obtaining information indicative of an error related to the ephemeris data;

determining range measurements using signals received with a multi-frequency GNSS receiver of the mobile device;

determining an ionosphere-free combination of range measurements using signals transmitted by the GNSS satellite; and determining a position estimate of the mobile device using a Precise Point Positioning (PPP) Extended Kalman filter (EKF) based at least in part on the ephemeris data, the ionosphere-free combination of range measurements, and an adjusted ambiguity of the PPP EKF, wherein the adjusted ambiguity of the PPP EKF is based at least in part on the information indicative of the error.

29. The computer-readable medium of claim 28, wherein the code for obtaining the information indicative of the error comprises code for computing orbit variation of the GNSS satellite over time.

30. The computer-readable medium of claim 28, wherein the code for obtaining the information indicative of the error comprises code for receiving the information indicative of an error at the mobile device from a server.

* * * * *